(12) United States Patent
Du et al.

(10) Patent No.: US 7,893,973 B2
(45) Date of Patent: Feb. 22, 2011

(54) IMAGE PROCESSOR AND IMAGE PROCESSING METHOD USING LUMINANCE VALUE RATE CHANGE

(75) Inventors: Jiyun Du, Ishikawa (JP); Satoshi Miyamoto, Ishikawa (JP); Nobuhisa Yamazaki, Ishikawa (JP)

(73) Assignee: PFU Limited, Ishikawa (JP)

( * ) Notice: Subject to any disclaimer, the term of this patent is extended or adjusted under 35 U.S.C. 154(b) by 379 days.

(21) Appl. No.: 12/187,228

(22) Filed: Aug. 6, 2008

(65) Prior Publication Data

US 2009/0147105 A1 Jun. 11, 2009

(30) Foreign Application Priority Data

Dec. 11, 2007 (JP) ............................. 2007-320206

(51) Int. Cl.
  H04N 5/238 (2006.01)
  H04N 9/64 (2006.01)
  G06K 9/00 (2006.01)

(52) U.S. Cl. ..................... 348/251; 348/364; 348/365; 382/137

(58) Field of Classification Search ................ 348/251, 348/364, 365; 382/137
See application file for complete search history.

(56) References Cited

U.S. PATENT DOCUMENTS 6,671,395 B1 * 12/2003 Ott et al. .................... 382/137

2008/0137118 A1 * 6/2008 Matsutani ................... 358/1.9

FOREIGN PATENT DOCUMENTS

| JP | 05-161002 A | 6/1993 |
| JP | 2005-269451 A | 9/2005 |

* cited by examiner

*Primary Examiner*—Sinh Tran
*Assistant Examiner*—Selam Gebriel
(74) *Attorney, Agent, or Firm*—Lowe Hauptman Ham & Berner LLP

(57) ABSTRACT

Document image data is converted into luminance image data. Block image data is generated from the luminance image data. Start point block pixel data and end point block pixel data are set based on a change rate of luminance values of adjacent block pixel data. A luminance value of block pixel data between the start point block pixel data and the end point block pixel data is corrected based on a start point luminance value and an end point luminance value. The luminance value, of the block pixel data wherein each luminance value of an adjacent block pixel data cluster is less than an average value, is substituted by the average value. The luminance value of each pixel data is set based on the luminance value of the block pixel data. Post process luminance image data that includes each pixel data is reconverted into the document image data.

7 Claims, 9 Drawing Sheets

IMAGE PROCESSOR AND IMAGE PROCESSING METHOD USING LUMINANCE VALUE RATE CHANGE

RELATED APPLICATIONS

The present application is based on, and claims priority from, Japan Application Number 2007-320206, filed Dec. 11, 2007, the disclosure of which is hereby incorporated by reference herein in its entirety.

BACKGROUND OF THE INVENTION

1. Field of the Invention

The present invention relates to an image processor and an image processing method, and more particularly, to an image processor and an image processing method that carry out image processing of document image data that is formed from a plurality of pixel data that are generated due to shooting of a document image.

2. Description of the Related Art

Recently, there has been an enhancement in image quality, enhancement in performance, and a reduction in cost of a two-dimensional image sensor that is included in a digital camera or a mobile camera such as a camera that is mounted on a mobile phone. The two-dimensional image sensor is normally used in photography. Further, due to increasingly high image quality and increasingly high performance of the two-dimensional image sensor, the two-dimensional image sensor can also be used to shoot or capture a document image such as a paper document, characters written on a blackboard or a white board of a meeting room, a newspaper sheet, a magazine etc. and character data of the document image can be saved as document image data.

In the document image data, which is formed from a plurality of pixel data that are generated due to shooting of the document image by the two-dimensional sensor, readability is more important than loyally reproducing an imaging target object such as scenery or a person. However, because the mobile camera is not used by prior setting conditions such as a position of a user, luminous surroundings, an imaging target etc., the document image data is not always readable.

For shooting the document image using the mobile camera and enhancing the readability of the generated document image data, an existing technology is suggested that carries out image processing using shading correction. For example, in the existing technology disclosed in Japanese Patent Application Laid-open No. 2005-269451, the document image data, which is formed from the multiple pixel data that are generated due to shooting of the document image, is converted into luminance image data that includes a luminance component. Each pixel data of the converted luminance image data is split into a plurality of blocks that include the same number of pixel data. Based on a maximum luminance value among each pixel data of each block, shading correction of each block pixel data is carried out, thus performing image processing.

The imaging target, which is the document image, may also include a material such as a book that is originally a flat surface but does not remain as a flat surface in a readable condition. In other words, the mobile camera is also used to shoot the document image that is originally in the form of a flat surface but does not remain as a flat surface in an imaged condition. Accordingly, because the document image is not a flat surface in the imaged condition, the document image data, which is generated by shooting with the mobile camera, the document image that is not a flat surface in the imaged condition, is likely to become difficult to read. Further, in another existing technology disclosed in Japanese Patent Application Laid-open No. H5-161002, an imaging sensor (the two-dimensional image sensor) is used to shoot the document image that is originally a flat surface but is not a flat surface in the imaged condition. The generated document image data is expanded to a flat surface.

However, in the existing technology disclosed in Japanese Patent Application Laid-open No. 2005-269451, if the document image data includes black pixel data or highlighted pixel data to some extent, luminous unevenness cannot be sufficiently curbed even after carrying out the shading correction. Due to this, if the document image data includes the black pixel data or the highlighted pixel data to some extent, the document image data after the image processing is not sufficiently readable. Further, in the existing technology disclosed in Japanese Patent Application Laid-open No. H5-161002, limiting a distance between the two-dimensional image sensor and the imaging target enables to expand the generated document image data to a flat surface. However, because the distance between the two-dimensional image sensor and the imaging object cannot be grasped in the mobile camera, such a technique is difficult to apply to the document image data that is generated using the mobile camera. Thus, it is difficult to enhance the readability of the document image data that is generated based on the document image that is shot using the two-dimensional image sensor and that is originally a flat surface but is not a flat surface in the imaged condition.

SUMMARY OF THE INVENTION

It is an object of the present invention to at least partially solve the problems in the conventional technology.

According to an aspect of the present invention, an image processor that carries out image processing of document image data that includes a plurality of pixel data that are generated due to shooting of a document image by a two-dimensional image sensor, includes a pixel data converter that converts the document image data into luminance image data that includes a luminance component; a block image data-generator that splits each pixel data of the luminance image data into a plurality of blocks that include the same number of pixel data, and generates block image data that includes block pixel data wherein a maximum luminance value, among a luminance value of each pixel data of each block, is treated as the luminance value of the respective block pixel data; a change rate-calculating unit that sequentially calculates towards a single direction, with respect to the luminance value of the block pixel data in the single direction that is adjacent to a linear block pixel data cluster that includes the adjacent block pixel data in the single direction, a change rate of the luminance value of the block pixel data in other direction; a start point end point-setting unit that compares, with a predetermined change rate towards the single direction, an absolute value of each calculated change rate, sets as start point block pixel data of luminance change, upon the absolute value of the change rate exceeding the predetermined change rate, the block pixel data in the single direction among the adjacent block pixel data, and sets as end point block pixel data of luminance change, upon the absolute value of the change rate exceeding the predetermined change rate once again, the block pixel data in the other direction among the adjacent block pixel data; a block pixel luminance value-correcting unit that corrects, based on a start point luminance value of the set start point block pixel data and an end point luminance value of the set end point block pixel data, each luminance value of the block pixel data between the start point block pixel data and the end point block pixel data; a luminance value-substituting unit that calculates, among each block pixel data, an average value of each luminance value of an adjacent block pixel data cluster that includes a single block pixel data and block pixel data that are adjacent to the single block pixel data, and substitutes by the average value, the luminance value of the block pixel data, among the adjacent block pixel data cluster, wherein the luminance value is less than the calculated average value; a pixel luminance value-setting unit that sets, based on the luminance value of the block pixel data, the luminance value of each pixel data corresponding to the block pixel data, and generates post process luminance image data; and a reconverter that reconverts the generated post process luminance image data into the document image data.

According to another aspect of the present invention, an image processing method that carries out image processing of document image data that includes a plurality of pixel data that are generated due to shooting of a document image, includes converting the document image data into luminance image data that includes a luminance component; splitting each pixel data of the luminance image data into a plurality of blocks that include the same number of pixel data, and generating block image data that includes block pixel data wherein a maximum luminance value, among a luminance value of each pixel data of each block, is treated as the luminance value of the respective block pixel data; sequentially calculating towards a single direction, with respect to the luminance value of the block pixel data in the single direction that is adjacent to a linear block pixel data cluster that includes the adjacent block pixel data in the single direction, a change rate of the luminance value of the block pixel data in other direction; comparing, with a predetermined change rate towards the single direction, an absolute value of each calculated change rate, setting as start point block pixel data of luminance change, upon the absolute value of the change rate exceeding the predetermined change rate, the block pixel data in the single direction among the adjacent block pixel data, and setting as end point block pixel data of luminance change, upon the absolute value of the change rate exceeding the predetermined change rate once again, the block pixel data in the other direction among the adjacent block pixel data; correcting, based on a start point luminance value of the set start point block pixel data and an end point luminance value of the set end point block pixel data, each luminance value of the block pixel data between the start point block pixel data and the end point block pixel data; calculating, among each block pixel data, an average value of each luminance value of an adjacent block pixel data cluster that includes a single block pixel data and block pixel data that are adjacent to the single block pixel data, and substituting by the average value, the luminance value of the block pixel data, among the adjacent block pixel data cluster, wherein the luminance value is less than the calculated average value; setting, based on the luminance value of the block pixel data, the luminance value of each pixel data corresponding to the block pixel data; and reconverting post process luminance image data that includes the pixel data having the set luminance value into the document image data.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. However, the present invention is not limited to the embodiments explained below. Further, structural components in the embodiments described below include all modifications and alternative constructions that may occur to one skilled in the art or that are essentially the same. Further, in the embodiments explained below, a controller of a mobile camera, which can shoot a document image and generate document image data, is used as an image processor to carry out image processing of the document image data. However, the present invention is not to be thus limited. For example, the document image data, which is shot and generated using the mobile camera, can be retrieved and image processing of the retrieved document image can be carried out.

Figure 1:
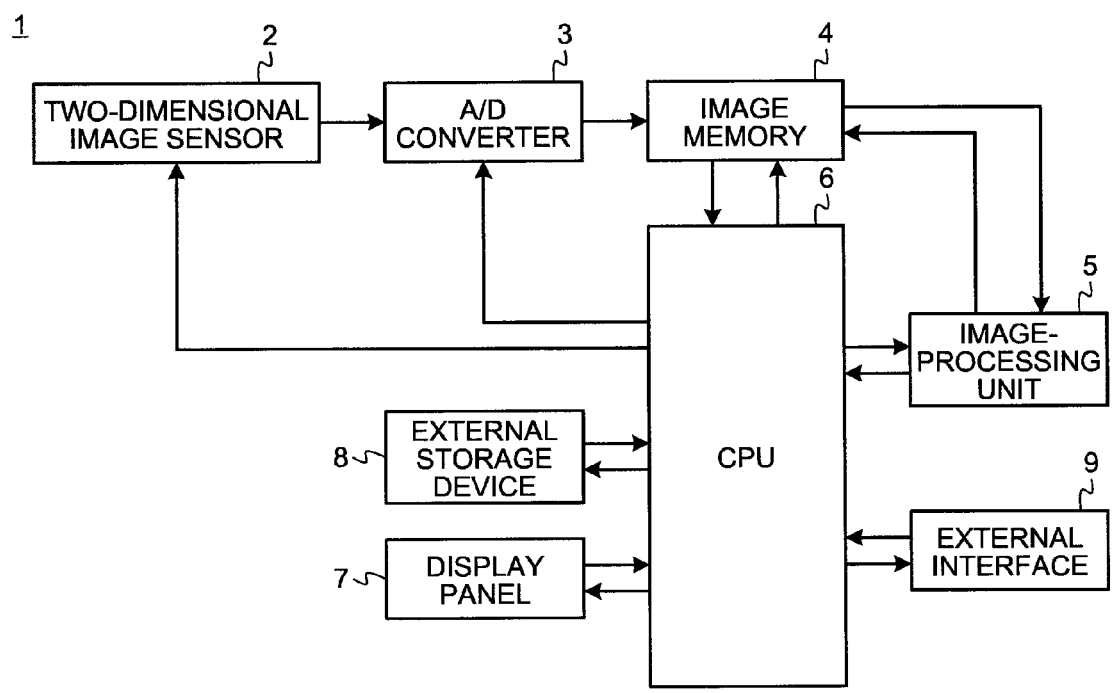
FIG. 1 is a block diagram of an image processor according to an embodiment of the present invention.
Figure 2:
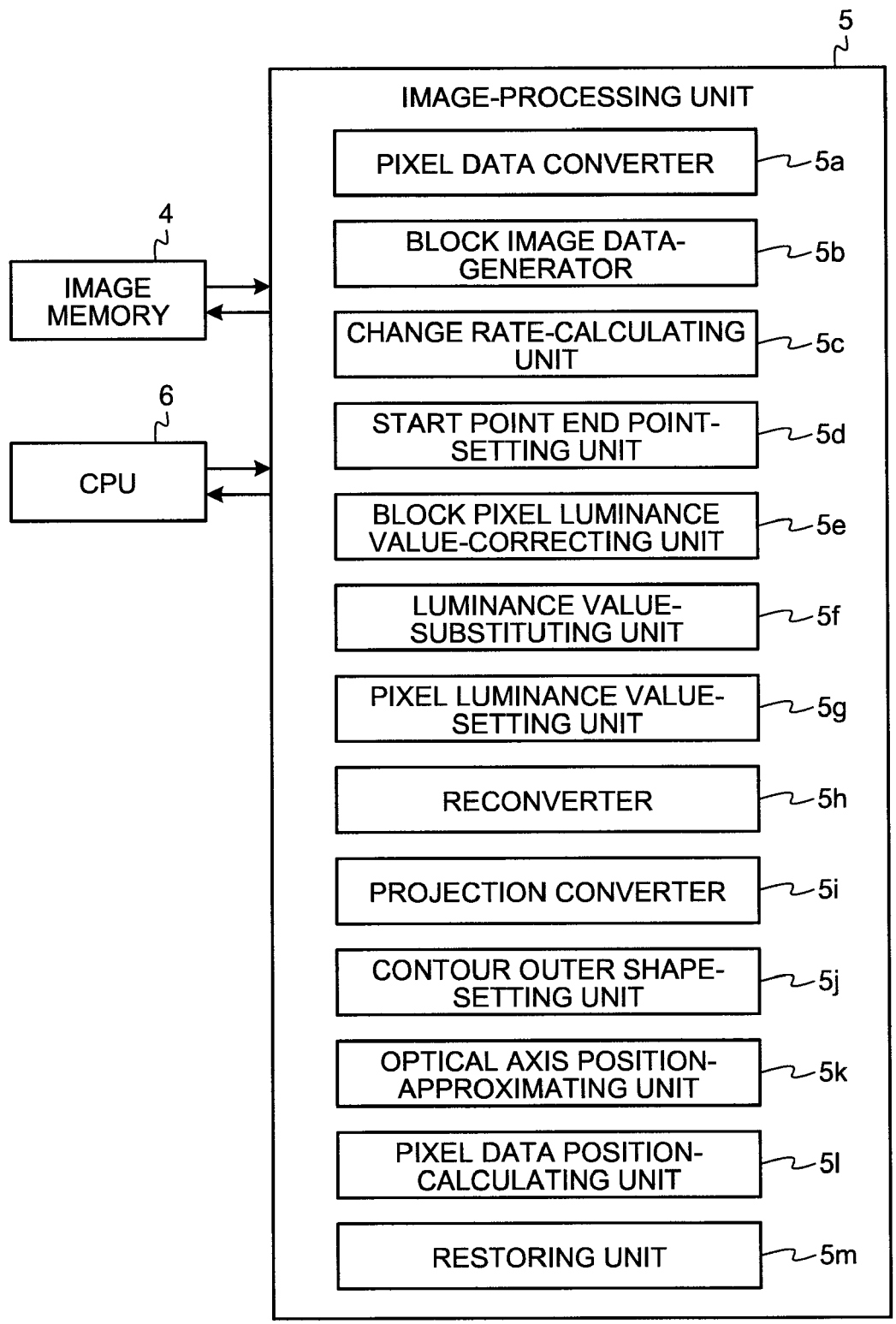
FIG. 2 is a block diagram of an image-processing unit according to the embodiment.
Figure 3:
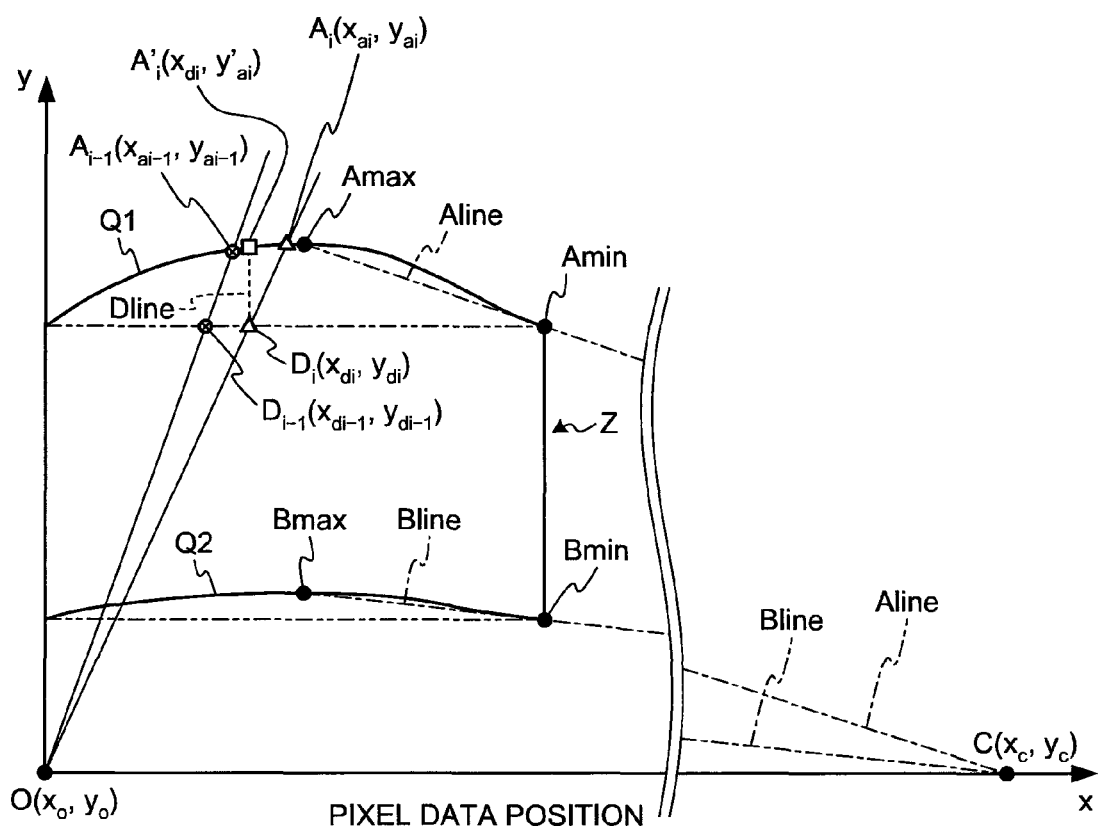
FIG. 3 is a graph of an approximation method of an optical axis.

FIG. 1 is a block diagram of an image processor according to an embodiment of the present invention. FIG. 2 is a block diagram of an image-processing unit according to the embodiment. FIG. 3 is a graph of an approximation method of an optical axis. An image processor 1 according to the embodiment is a digital camera or a mobile camera such as a camera that is mounted on a mobile phone. As shown in FIGS. 1 and 2, the image processor 1 according to the embodiment includes a two-dimensional image sensor 2, an analog to digital (A/D) converter 3, an image memory 4, an image-processing unit 5, a central processing unit (CPU) 6, a display panel 7, an external storage device 8, and an external interface 9.

The two-dimensional image sensor 2 is an imaging sensor that shoots scenery, a person, a document image etc. that is an imaging target object. The two-dimensional image sensor 2 includes a plurality of imaging elements that are arranged in a vertical direction (y direction) and a horizontal direction (x direction). The imaging elements include a filter of any one of red (R), green (G), and blue (B) colors. Upon shooting once, in other words, upon being exposed once, the two-dimensional image sensor 2 outputs analog values that correspond to the imaging elements and that indicate R, G, and B colors.

The A/D converter 3 generates image data due to shooting by the two-dimensional image sensor 2. The A/D converter 3 is connected to the two-dimensional image sensor 2 and converts into digital values, the analog values of the image data that is output from the two-dimensional image sensor 2. In other words, upon the two-dimensional image sensor 2 shooting the document image, the A/D converter 3 converts into the digital values, the analog values that are output from the two-dimensional image sensor 2, and generates a plurality of pixel data that form the document image data. Thus, the A/D converter 3 generates the document image data based on the document image due to shooting of the document image by the two-dimensional image sensor 2. Each generated pixel data includes RGB values and the document image data is color image data.

The image memory 4 saves therein the image data. The image memory 4 is connected to the A/D converter 3 and saves therein the image data that is converted into the digital values by the A/D converter 3. In other words, the image memory 4 can save therein the document image data that is converted into the digital values by the A/D converter 3. Further, the image memory 4 also saves therein the image data that is processed by the image-processing unit 5. In other words, the image memory 4 can save therein the document image data that is processed by the image-processing unit 5.

The image-processing unit 5 processes the image data. The image-processing unit 5 is connected to the image memory 4 and processes the image data that is saved in the image memory 4. In other words, the image-processing unit 5 can process the document image data that is saved in the image memory 4. Further, the image-processing unit 5 is connected to the CPU 6 and is controlled by the CPU 6.

The image-processing unit 5 includes functions of a pixel data converter 5a, a block image data-generator 5b, a change rate-calculating unit 5c, a start point end point-setting unit 5d, a block pixel luminance value-correcting unit 5e, a luminance value-substituting unit 5f, a pixel luminance value-setting unit 5g, a reconverter 5h, a projection converter 5i, a contour outer shape-setting unit 5j, an optical axis position-approximating unit 5k, a pixel data position-calculating unit 5l, and a restoring unit 5m. The pixel data converter 5a, the block image data-generator 5b, the change rate-calculating unit 5c, the start point end point-setting unit 5d, the block pixel luminance value-correcting unit 5e, the luminance value-substituting unit 5f, the pixel luminance value-setting unit 5g, and the reconverter 5h are used for carrying out shading correction of the document image data. Further, the pixel data converter 5a, the projection converter 5i, the contour outer shape-setting unit 5j, the optical axis position-approximating unit 5k, the pixel data position-calculating unit 5l, and the restoring unit 5m are used for carrying out shape correction of the document image data that is based on the document image that is originally a flat surface but is not a flat surface in the imaged condition.

The pixel data converter 5a is a pixel data-converting unit. The pixel data converter 5a converts the document image data, which is saved in the image memory 4, into luminance image data that includes a luminance component. In the embodiment, the pixel data converter 5a converts using the Lab conversion, each pixel data of the document image data, which is saved in the image memory 4 due to shooting of the document image by the two-dimensional image sensor 2, into the luminance image data (hereinafter, simply "luminance image data for luminance correction") that includes a luminance value la and two hue values a and b. Further, the pixel data converter 5a converts using the Lab conversion, each pixel data of the document image data, which is saved in the image memory 4 due to projection conversion by the projection converter 5i, into luminance image data (hereinafter, simply "luminance image data for shape correction") that includes a luminance value lt and two hue values at and bt.

The block image data-generator 5b is a block image data-generating unit. The block image data-generator 5b splits each pixel data ia of the luminance image data for luminance correction that is converted by the pixel data converter 5a into a plurality of blocks that include the same number of pixel data. Next, the block image data-generator 5b generates block image data that includes block pixel data I. In the block pixel data I, a maximum luminance value lamax, among the luminance values la of each pixel data ia of each split block, is treated as a luminance value L of the block pixel data I.

The change rate-calculating unit 5c sequentially calculates in a single direction, a change rate $\Delta L$ of a luminance value Lb of block pixel data Ib, with respect to a luminance value La of block pixel data Ia that is adjacently positioned, in the other direction, on one side of a linear block pixel data cluster TI that includes, among the block pixel data, the block pixel data I that are adjacently positioned in the single direction. In other words, the change rate-calculating unit 5c calculates the change rate $\Delta L$ with respect to all the adjacent block pixel data I that are included in the linear block pixel data cluster TI. In the embodiment, the change rate-calculating unit 5c calculates the change rate $\Delta L$ in a vertical direction and a horizontal direction of the block image data. In other words, the change rate $\Delta L$ is calculated in a single direction (in the vertical direction and in the horizontal direction) of the block image data. Accordingly, the change rate-calculating unit 5c sequentially calculates in a single direction, a change rate $\Delta Ly$ of a luminance value Lby of block pixel data Iby, with respect to a luminance value Lay of block pixel data Iay that is adjacently positioned, in the other direction, on one side of a linear block pixel data cluster TIy that includes, among the block pixel data, block pixel data Iy that are adjacently positioned in the vertical direction. Similarly, the change rate-calculating unit 5c sequentially calculates in a single direction, a change rate $\Delta Lx$ of a luminance value Lbx of block pixel data Ibx, with respect to a luminance value Lax of block pixel data Iax that is adjacently positioned, in the other direction, on one side of a linear block pixel data cluster TIx that includes, among the block pixel data, block pixel data Ix that are adjacently positioned in the horizontal direction. Further, the linear block pixel data cluster TIy is set according to a number of the vertical block pixel data I. Similarly, the linear block pixel data cluster TIx is set according to a number of the horizontal block pixel data I. In other words, the linear block pixel data clusters TI are set such that all the block pixel data that form the block image data are included once in the respective linear block pixel data cluster TIy in the vertical direction or the linear block pixel data cluster TIx in the horizontal direction.

The start point end point-setting unit 5d compares absolute values of the respective calculated change rates $\Delta L$ to a predetermined change rate $\Delta Lo$ in a single direction. Upon the change rate $\Delta L$ exceeding the predetermined change rate $\Delta Lo$, the start point end point-setting unit 5d sets, among the adjacent block pixel data Ia and Ib, the block pixel data Ia on one side as start point block pixel data Is. Similarly, upon the change rate $\Delta L$, which is based on the block pixel data I in the other direction of the start point block pixel data Is, once again exceeding the predetermined change rate $\Delta Lo$, the start point end point-setting unit 5d sets, among the adjacent block pixel data Ia and Ib, the block pixel data Ib on the opposite side as end point block pixel data Ie. In other words, in the embodiment, the start point end point-setting unit 5*d* sets start point block pixel data Isy and end point block pixel data Iey for each linear block pixel data cluster TIy in the vertical direction. Similarly, the start point end point-setting unit 5*d* sets start point block pixel data Isx and end point block pixel data Iex for each linear block pixel data cluster TIx in the vertical direction.

Based on a start point luminance value Ls of the set start point block pixel data Is and an end point luminance value Le of the set end point block pixel data Ie, the block pixel luminance value-correcting unit 5*e* corrects a luminance value Lc of block pixel data Ic between the start point block pixel data Is and the end point block pixel data Ie among the linear block pixel data cluster TI. In the embodiment, the block pixel luminance value-correcting unit 5*e* calculates and corrects the luminance value Lc of the block pixel data Ic among the linear block pixel data cluster TI from the start point luminance value Ls of the set start point block pixel data Is, the end point luminance value Le of the end point block pixel data Ie, a distance Xsc from the start point block pixel data Is to the block pixel data Ic that is a correction target, a distance Xse from the start point block pixel data Is to the end point block pixel data Ie, and an expression (1) that is explained below. Accordingly, for the linear block pixel data cluster TIy (TI) in the vertical direction, the block pixel luminance value-correcting unit 5*e* calculates and corrects a luminance value Lcy (Lc) of the block pixel data Icy (Ic) from a start point luminance value Lsy (Ls) of the set start point block pixel data Isy (Is), an end point luminance value Ley (Le) of the set end point block pixel data Iey (Ie), a distance Xscy (Xsc) from the start point block pixel data Isy to the block pixel data Icy that is a correction target, a distance Xsey (Xse) from the start point block pixel data Isy to the end point block pixel data Iey, and the expression (1) that is explained below. Similarly, for the linear block pixel data cluster TIx (TI) in the horizontal direction, the block pixel luminance value-correcting unit 5*e* calculates and corrects a luminance value Lcx (Lc) of the block pixel data Icx (Ic) from a start point luminance value Lsx (Ls) of the set start point block pixel data Isx (Is), an end point luminance value Lex (Le) of the set end point block pixel data Iex (Ie), a distance Xscx (Xsc) from the start point block pixel data Isx to the block pixel data Icx that is a correction target, a distance Xsex (Xse) from the start point block pixel data Isx to the end point block pixel data Iex, and the expression (1) that is explained below.

$$Lc=(Le-Ls)/Xse \times Xsc+Ls \quad (1)$$

If the end point block pixel data Ie cannot be set by the start point end point-setting unit 5*d*, based on a luminance value Lo of the block pixel data Io, which is positioned on one side of the set start point block pixel data Is, and the start point luminance value Ls of the set start point block pixel data Is, the block pixel luminance value-correcting unit 5*e* corrects a luminance value Ld of each block pixel data Id on the other side of the start point block pixel data Is. In the embodiment, if the end point block pixel data Ie cannot be set by the start point end point-setting unit 5*d*, based on a luminance value Lot of block pixel data Iot, which is positioned on one side of the linear block pixel data cluster TI among the block pixel data Io that are on one side of the set start point block pixel data Is, and the start point luminance value Ls of the set start point block pixel data Is, the block pixel luminance value-correcting unit 5*e* corrects the luminance value Ld of each block pixel data Id on the opposite side of the start point block pixel data Is. The block pixel luminance value-correcting unit 5*e* uses a least squares method to correct the luminance value Ld of each block pixel data Id on the opposite side of the start point block pixel data Is. Accordingly, for the linear block pixel data cluster TIy (TI) in the vertical direction, based on a luminance value Loty (Lot) of block pixel data Ioty (Iot), which is positioned at the end on one side of the linear block pixel data cluster TIy (TI) that is on one side of the set start point block pixel data Isy (Is), and the start point luminance value Lsy (Ls) of the set start point block pixel data Isy (Is), the block pixel luminance value-correcting unit 5*e* corrects a luminance value Ldy (Ld) of each block pixel data Idy (Id) that is on the other side of the start point block pixel data Isy (Is). Similarly, for the linear block pixel data cluster TIx (TI) in the horizontal direction, based on a luminance value Lotx (Lot) of block pixel data Iotx (Iot), which is positioned at the end on one side of the linear block pixel data cluster TIx (TI) that is on one side of the set start point block pixel data Isx (Is), and the start point luminance value Lsx (Ls) of the set start point block pixel data Isx (Is), the block pixel luminance value-correcting unit 5*e* corrects a luminance value Ldx (Ld) of each block pixel data Idx (Id) that is on the other side of the start point block pixel data Isy (Is).

If the corrected block pixel data Icy (Icx) and Idy (Idx) exist in at least a single direction of the linear block pixel data cluster TIy in the vertical direction or the linear block pixel data cluster TIx in the horizontal direction, the block pixel luminance value-correcting unit 5*e* treats as the luminance value L (Lc, Ld) of the corrected block pixel data I (Ic, Id), average values Lca and Lda, of the luminance values Lcy (Lcx), Ldy (Ldx) of the corrected block pixel data Icy (Icx), Idy (Idx) in the linear block pixel data cluster TIy (TIx) in a single direction and a luminance value Lf (Lf=Lcx (Lcy) and Ldx (Ldy) if corrected, and Lf=L if not corrected) of block pixel data If (If=Icx (Icy) and Idx (Idy) if corrected, If=I if not corrected) in the linear block pixel data cluster TIx (TIy) that is in the same position with respect to the block image data as the corrected block pixel data Icy (Icx) and Idy (Idx).

The luminance value-substituting unit 5*f* calculates a block average value LA that is an average value of each luminance value Lg, Lh of respective block pixel data Ig, Ih of adjacent block pixel data cluster KI that includes the single block pixel data Ig and the adjoining single block pixel data Ih among the block pixel data I. Among the adjacent block pixel data cluster KI, The luminance value-substituting unit 5*f* substitutes the luminance value L (Lg, Lh) of the block pixel data I (Ig, Ih) by the block average value LA (L=LA) for the luminance value L (Lg, Lh) that is less than the calculated block average value LA. In the embodiment, the luminance value-substituting unit 5*f* sets the adjacent block pixel data cluster KI by treating each block pixel data I as the single block pixel data Ig. The luminance value-substituting unit 5*f* forms the adjacent block pixel data cluster KI with the single block pixel data Ig and all the block pixel data Ih that are adjacent to the single block pixel data Ig, and calculates the block average value LA based on each luminance value Lg, Lh. Thus, unless the single block pixel data Ig is at the end portion of the block pixel data, the adjacent block pixel data cluster KI includes a total of nine block pixel data Ig, Ih that are formed by the single block pixel data Ig and eight block pixel data Ih.

Based on the luminance value L of each block pixel data I, the pixel luminance value-setting unit 5*g* sets a luminance value lb of each pixel data ib that corresponds to each block pixel data I and generates luminance image data for post process luminance correction that includes each pixel data ib of the luminance value lb. In the embodiment, based on a luminance value Lj of a single block pixel data Ij and a luminance value Lk of a block pixel data Ik that is adjacent to the single block pixel data Ij, the pixel luminance value-setting unit 5g sets the luminance value lj of each pixel data ij corresponding to the single block pixel data Ij among each block pixel data I. The pixel luminance value-setting unit 5g sets the luminance value lb (lj) of each pixel data ib (ij) corresponding to each block pixel data I by using a linear interpolation method or a three dimensional spline interpolation method.

Further, the pixel luminance value-setting unit 5g corrects the luminance value lb, which is set based on a ratio lba/laa and a ratio hba/haa, of each block pixel data ib. The ratio lba/laa indicates a ratio of a post setting average value lba, which is an average value of the luminance value lb of each set pixel data ib, and a post conversion average value laa that is an average value of the luminance value la of each pixel data ia of the luminance image data for luminance correction that is converted by the pixel data converter 5a. The ratio hba/haa indicates a ratio of a post setting peak value hba, which is a peak value of a histogram based on the luminance value lb of each pixel data ib that is set by the pixel luminance value-setting unit 5g, and a post conversion peak value haa that is a peak value of a histogram based on the luminance value la of each pixel data ia of the luminance image data for luminance correction that is converted by the pixel data converter 5a. In other words, the pixel luminance value-setting unit 5g also corrects and regenerates the luminance image data for post process luminance correction. The pixel luminance value-setting unit 5g calculates and corrects each luminance value lc of each pixel data ic corresponding to each block pixel data I from the luminance value lb of each set pixel data ib, the luminance value la of each set pixel data ia, the ratio (laa/lba) of the post setting average value lba and the post conversion average value laa, the ratio (haa/hba) of the post setting peak value hba and the post conversion peak value haa, and expressions (3) and (4) that are explained below. Due to this, the pixel luminance value-setting unit 5g corrects the luminance image data for post process luminance correction which includes each pixel data ib of the luminance value lb and generates luminance image data for post process luminance correction that includes each pixel data ic of the luminance value lc.

$$K=((lba/laa)+(hba/haa))/2\times 255 \quad (3)$$

$$lc=K\times la/lb \quad (4)$$

The reconverter 5h reconverts the generated luminance image data for post process luminance correction into the document image data. The reconverter 5h reconverts into the document image data, the luminance image data for post process luminance correction that includes each pixel data ic that is formed of the luminance value lc and two hue values a and b. In the embodiment, the reconverter 5h carries out RGB conversion of each pixel data of the luminance image data for post process luminance correction, thus reconverting the luminance image data for post process luminance correction into the document image data that includes RGB values.

The projection converter 5i carries out projection conversion of the document image data. In the embodiment, the projection converter 5i carries out projection conversion of the document image data that is reconverted by the reconverter 5h. In the projection conversion, if the surface that forms the document image is inclined and is not perpendicular to the optical axis of the two-dimensional image sensor 2, the document image is converted such that the document image is on the surface that is perpendicular to the optical axis of the two-dimensional image sensor 2.

The contour outer shape-setting unit 5j sets a contour outer shape Z of the luminance image data for shape correction that is converted by the pixel data converter 5a. The contour outer shape-setting unit 5j extracts a contour outer shape z of the luminance image data for shape correction. Pixel data it of the luminance image data for shape correction includes pixel data itd corresponding to the document image and pixel data itb corresponding to a background of the document image. The contour outer shape-setting unit 5j uses a known technology such as cropping and extracts the contour outer shape z of the luminance image data for shape correction. In other words, from each pixel data it of the luminance image data for shape correction, the contour outer shape-setting unit 5j extracts a boundary of each pixel data itd corresponding to the document image and each pixel data itb corresponding to the background of the document image. If the luminance image data for shape correction is based on the document image that is not a flat surface in the imaged condition but is originally a flat surface, the contour outer shape z includes four sides such that a pair of two sides is formed of straight lines and another pair of two sides is formed of curved lines. Especially, after the projection converter 5i has carried out the projection conversion, the contour outer shape z includes a pair of two sides that are formed by parallel straight lines and another pair of two sides that are formed by curved lines. Accordingly, in the contour outer shape z of the luminance image data for shape correction, which is based on the document image that is not a flat surface in the imaged condition but is originally a flat surface, the other pair of two sides is formed of curved lines, thus resulting in a distortion. Due to this, the contour outer shape-setting unit 5j calculates the curved lines of the pair of two sides.

The contour outer shape-setting unit 5j randomly selects a plurality of pixel data corresponding to each curved line of the pair of two sides of the contour outer shape z of the luminance image data for shape correction. In the embodiment, the contour outer shape-setting unit 5j randomly selects the respective multiple pixel data itd corresponding to the document image that is the boundary. Based on positions of the randomly selected multiple pixel data itd, the contour outer shape-setting unit 5j calculates respective curved lines Q1 and Q2 of the two sides. In the embodiment, the contour outer shape-setting unit 5j calculates the curved lines Q1 and Q2 using the positions of the randomly selected multiple pixel data itd and three dimensional spline interpolation, and sets as the contour outer shape Z of the luminance image data for shape correction, the parallel straight lines of the pair of two sides and the calculated curved lines Q1 and Q2 that are the other pair of two sides. Accordingly, because the curved lines Q1 and Q2, which are calculated as the other pair of two sides of the contour outer shape Z are smooth, the positions of all the pixel data of the other pair of two sides of the contour outer shape Z can be compared to the respective linked straight lines and the contour outer shape Z of the luminance image data for shape correction can be approximated to the contour outer shape of the document image. Due to this, shape correction can be precisely carried out.

Based on a distortion of the contour outer shape Z of the luminance image data for shape correction that is set by the contour outer shape-setting unit 5j, the optical axis position-approximating unit 5k approximates a position O ($x_o$, $y_o$) of the optical axis. As shown in FIG. 3, in the embodiment, based on the curved lines Q1 and Q2 that are calculated as the other pair of two sides among the contour outer shape Z, the optical axis position-approximating unit 5k approximates the position O ($x_o$, $y_o$) of the optical axis. The optical axis position-approximating unit 5k sets on a y axis, one of the parallel straight lines that are the pair of two sides among the contour outer shape Z. Next, the optical axis position-approximating unit 5k sets a maximum point Amax and a minimum point Amin in the y axis of one of the curved lines Q1 and calculates a straight line Aline that links the maximum point Amax and the minimum point Amin. Further, the optical axis position-approximating unit 5k sets a maximum point Bmax and a minimum point Bmin in the y axis of the other curved line Q2 and calculates a straight line Bline that links the maximum point Bmax and the minimum point Bmin. Next, the optical axis position-approximating unit 5k calculates a position C ($x_c$, $y_c$) of an intersection point of the calculated straight lines Aline and Bline. The optical axis position-approximating unit 5k calculates as an x axis, a straight line that passes the position C ($x_c$, $y_c$) of the intersection point and that is perpendicular to the y axis. Next, the optical axis position-approximating unit 5k calculates as the position O ($x_o$, $y_o$) of the optical axis, an intersection point of the calculated x axis and the y axis, and approximates the position O ($x_o$, $y_o$) of the optical axis with respect to the luminance image data for shape correction.

Based on the position O ($x_o$, $y_o$) of the optical axis that is calculated by the optical axis position-approximating unit 5k, a focal length f of the two-dimensional image sensor 2, and a pitch k of the imaging elements that form the two-dimensional image sensor 2, the pixel data position-calculating unit 5l calculates a flat surface position it ($x_{it}$, $y_{it}$) in a two-dimensional flat surface that does not include a distortion of the contour outer shape Z of each pixel data it of the luminance image data for shape correction. In the embodiment, the pixel data position-calculating unit 5l calculates a flat surface position itd ($x_{itd}$, $y_{itd}$) in a two-dimensional flat surface that does not include a distortion of the contour outer shape Z of each pixel data itd corresponding to the document image of the luminance image data for shape correction. The pixel data position-calculating unit 5l calculates an x coordinate ($x_{itd}$) from the position O ($x_o$, $y_o$) of the optical axis, the focal length f, the pitch k, and the expression (5). A coordinate $y_{di}$ indicates a y coordinate of a position Di ($x_{di}$, $y_{di}$) of random pixel data $D_i$ of each x direction pixel data cluster that includes adjacent pixel data in an x axial direction among each pixel data itd of the luminance image data for shape correction. A coordinate $y_{ai}$ indicates a y coordinate of a position Ai ($x_{ai}$, $y_{ai}$) of an intersection point of the direct line, which links the optical axis and the random pixel data Di, and the curved line Q1. A coordinate $y_{di-1}$ indicates a y coordinate of a position $D_{i-1}$ ($x_{di-1}$, $y_{di-1}$) of adjacent pixel data $D_{i-1}$ that is adjacent to the random pixel data $D_i$ in the x axial direction. A coordinate $y_{ai-1}$ indicates a y coordinate of a position $A_{i-1}$ ($x_{ai-1}$, $y_{ai-1}$) of an intersection point of the direct line, which links the optical axis and the adjacent pixel data $D_{i-1}$, and the curved line Q1.

$$x_{itd} = \sum_{i=0}^{i} \sqrt{1 + \left(\frac{y_{di}}{y_{ai}} - \frac{y_{di-1}}{y_{ai-1}}\right)^2 \times (f \times k)^2} \quad (5)$$

The pixel data position-calculating unit 5l calculates the y coordinate ($y_{itd}$) using the expression (6) that is explained below. The coordinate $y_{di}$ indicates the y coordinate of the position $D_i$ ($x_{di}$, $y_{di}$) of the pixel data $D_i$ that intersects with the direct line that is parallel to the x axis that passes the minimum point Amin of each y axial direction pixel data cluster that includes the adjacent pixel data in the y axial direction among the pixel data itd corresponding to the document image of the luminance image data for shape correction. A coordinate $y'_{ai}$ indicates a y coordinate of a position $A'_i$ ($x_{di}$, $y'_{ai}$) of an intersection point of a straight line Dline that passes the random pixel data $D_i$ and that is parallel to the y axis, and the curved line Q1. A coordinate $y_{itdo}$ indicates a y coordinate of an original position ($x_{itdo}$, $y_{itdo}$) of the pixel data itd corresponding to the document image of the luminance image data for shape correction. In other words, the y coordinate ($y_{itd}$) of a flat surface position itd in the two-dimensional flat surface of the pixel data itd is calculated by using a ratio for compressing the coordinate $y'_{ai}$ till the coordinate $y_{di}$.

$$y_{itd} = (y_{di}/y'_{ai}) \times y_{itdo} \quad (6)$$

Based on the flat surface position it ($x_{it}$, $y_{it}$) in the two-dimensional flat position of each pixel data it that is calculated by the pixel data position-calculating unit 5l, the restoring unit 5m restores the document image data. In the embodiment, based on the flat surface position it ($x_{itd}$, $y_{itd}$) in the two-dimensional flat position of each pixel data itd that corresponds to the document image and that is calculated by the pixel data position-calculating unit 5l, the restoring unit 5m restores the document image data. The flat surface position itd ($x_{itd}$, $y_{itd}$) in the two-dimensional flat surface of each pixel data itd that is calculated by the pixel data position-calculating unit 5l is not always an integer. However, a position iu ($x_{iu}$, $y_{iu}$) of each pixel data iu of the document image data (the luminance image data for shape correction) needs to be an integer. To overcome the drawback, based on the flat surface position itd ($x_{itd}$, $y_{itd}$) in the two-dimensional flat surface position of each pixel data itd, the restoring unit 5m sets the pixel data iu in which the position iu ($x_{iu}$, $y_{iu}$) is an integer. For example, the restoring unit 5m sets the multiple pixel data iu such that the position iu ($x_{iu}$, $y_{iu}$) of each set pixel data iu is included inside an area of the flat surface position itd ($x_{itd}$, $y_{itd}$) in the two-dimensional flat surface position of all the pixel data itd. Based on the luminance value ltd of the flat surface position itd ($x_{itd}$, $y_{itd}$) in the two-dimensional flat surface position of each contiguous pixel data itd and two hue values atd and btd, the restoring unit 5m sets the luminance value l and two hue values a and b of each set pixel data iu. The restoring unit 5m uses the linear interpolating method or the three dimensional spline interpolation method to set the luminance value lu and two hue values au and bu of each pixel data iu and generates post shape correction luminance image data that includes each pixel data iu that includes the luminance value lu and the two hue values au and bu. Next, the restoring unit 5m reconverts the generated post shape correction luminance image data into the document image data. In the embodiment, the restoring unit 5m carries out the RGB conversion of each pixel data of the post shape correction luminance image data, thus restoring the document image data that includes the RGB values.

The CPU 6 controls the image processor 1. The CPU 6 is connected to the image memory 4, the image-processing unit 5, the display panel 7, the external storage device 8, and the external interface 9. The CPU 6 controls the image memory 4 and controls image processing of the image data, including the document image data, by the image-processing unit 5. Further, the CPU 6 also carries out display control by the display panel 7, transceiving control of data with the external storage device 8, and transceiving control of data with an external device (not shown in the drawings) via the external interface 9.

The display panel 7 displays data. The display panel 7 can display the image data, including the document image data that is saved in the image memory 4. The display panel 7 is connected to the CPU 6 and is controlled by the CPU 6.

The external storage device 8 is a portable storage unit. The external storage device 8 can save therein the image data, including the document image data that is saved in the image memory 4 of the image processor 1, via the CPU 6. The image memory 4 can also save therein the image data, including the document image data that is saved in the external storage device 8, via the CPU 6. The external storage device 8 is connected to the CPU 6 and is controlled by the CPU 6.

The external interface 9 electrically connects the external device, which is arranged outside the image processor 1, and the image processor 1. The external interface 9 can save via the CPU 6, the image data, including the document image data that is saved in the image memory 4 of the image processor 1, in the external device that is electrically connected to the external interface 9. The image memory 4 can save therein the image data, including the document image data that is saved in the external device, via the CPU 6. The external interface 9 is connected to the CPU 6 and is controlled by the CPU 6.

Figure 4:
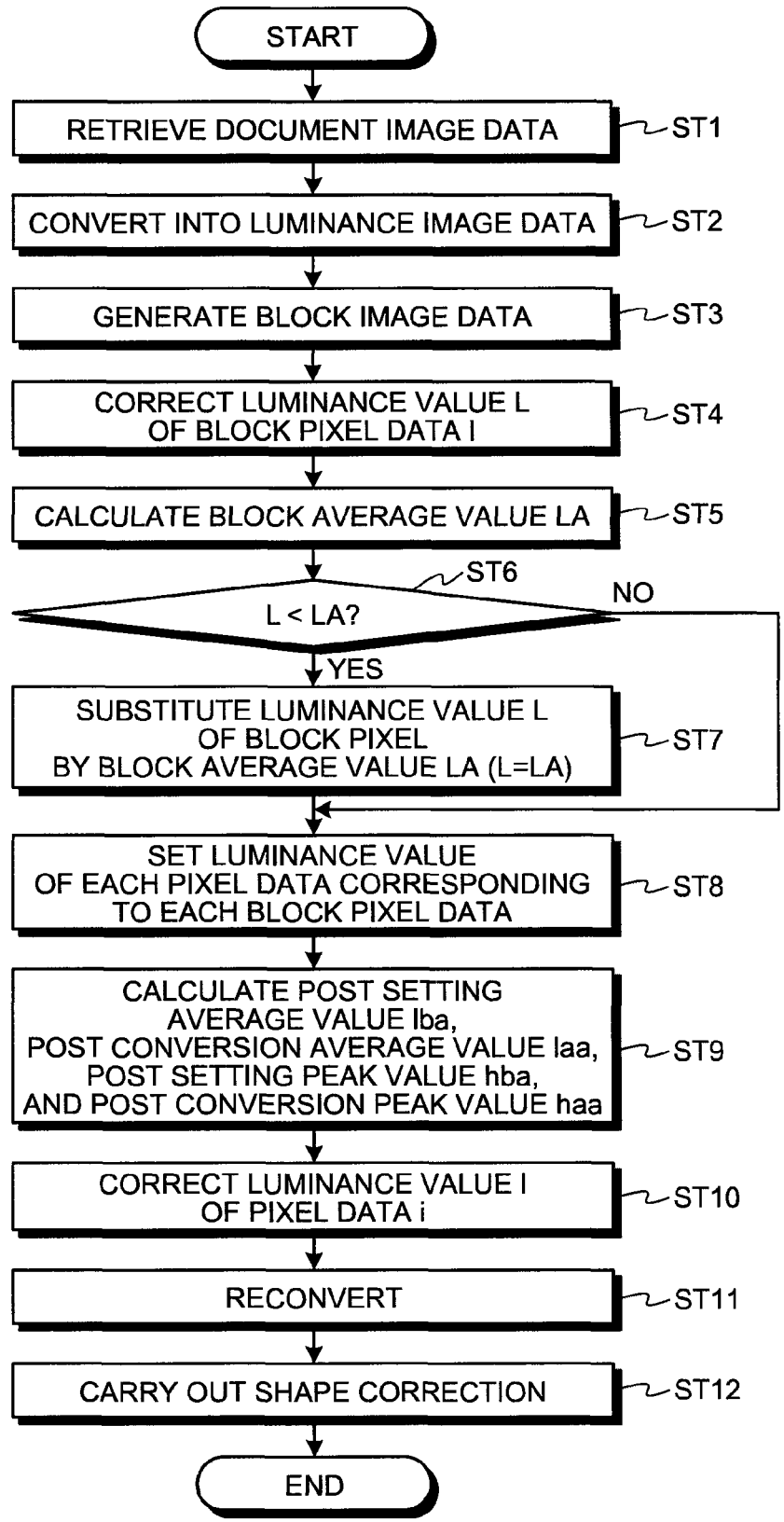
FIG. 4 is an entire flowchart of an image processing method that is used by the image processor.
Figure 5:
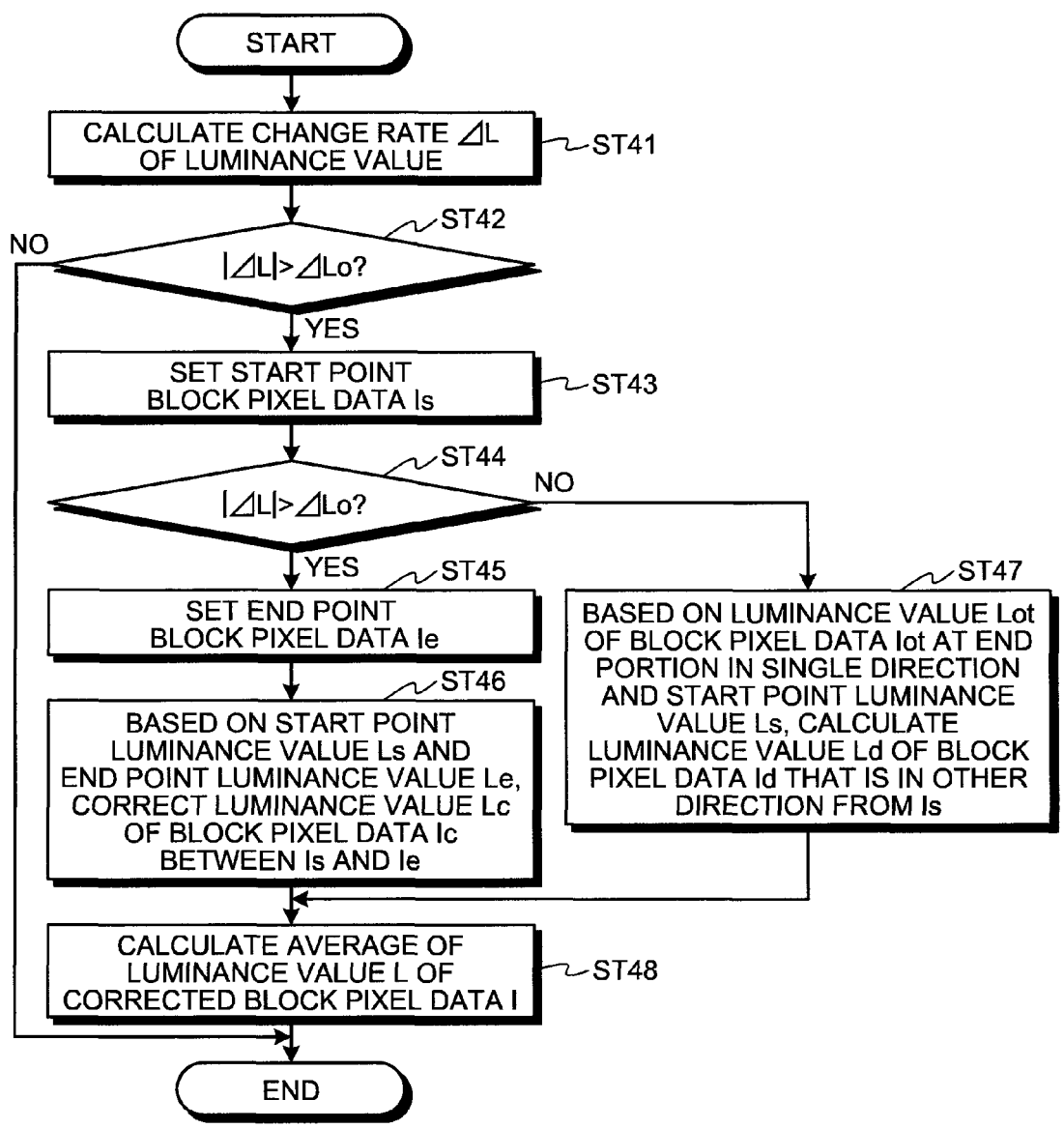
FIG. 5 is a partial flowchart of the image processing method by the image processor.
Figure 6:
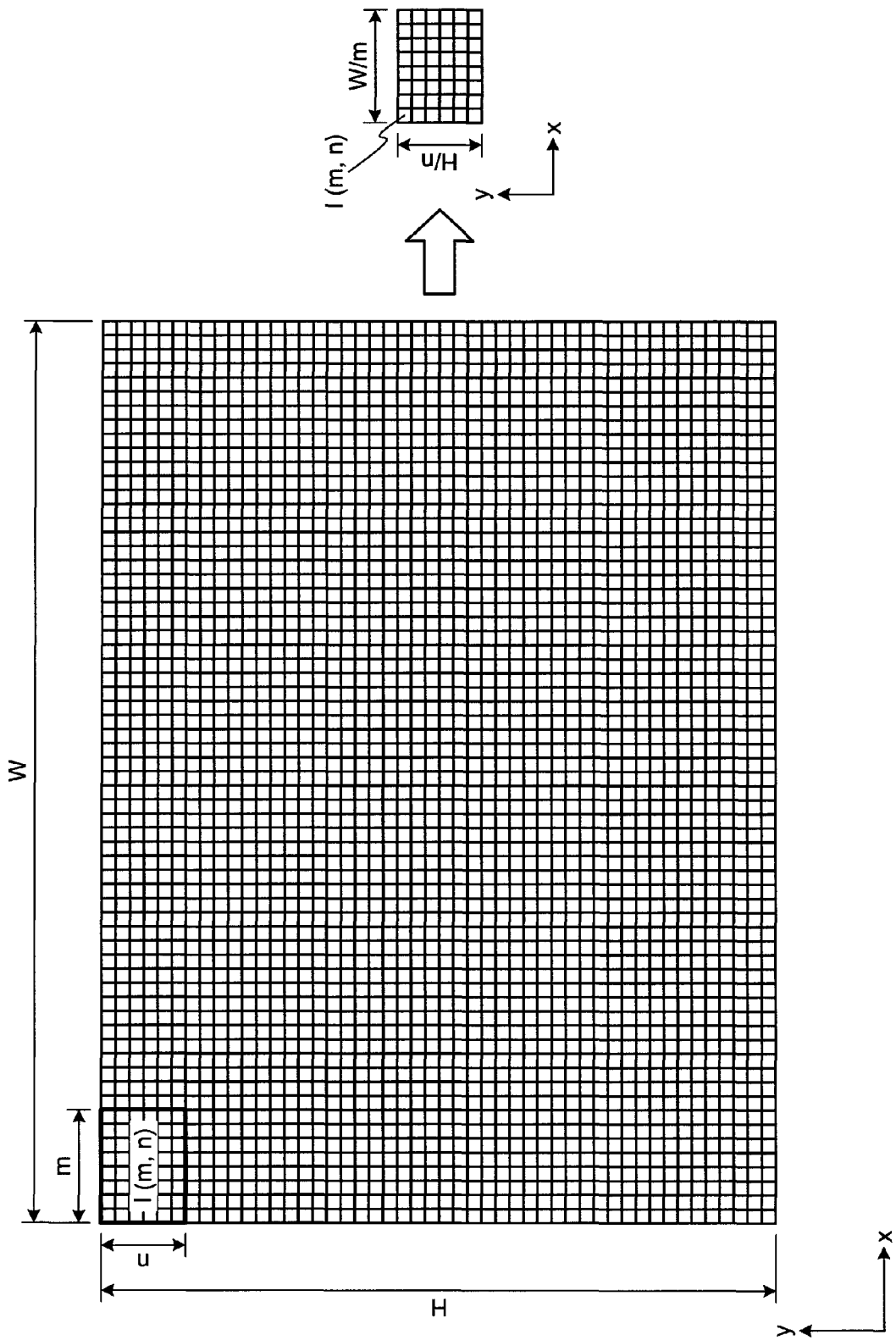
FIG. 6 is a schematic diagram of document image data and block image data.
Figure 7:
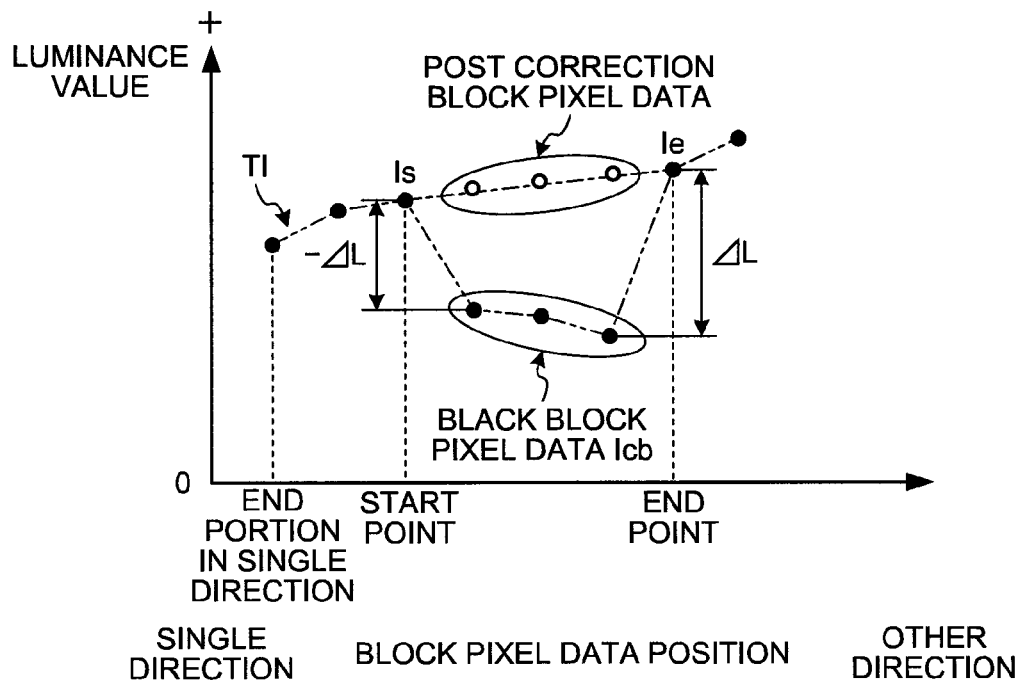
FIG. 7 is a graph of a correcting method of black block pixel data.
Figure 8:
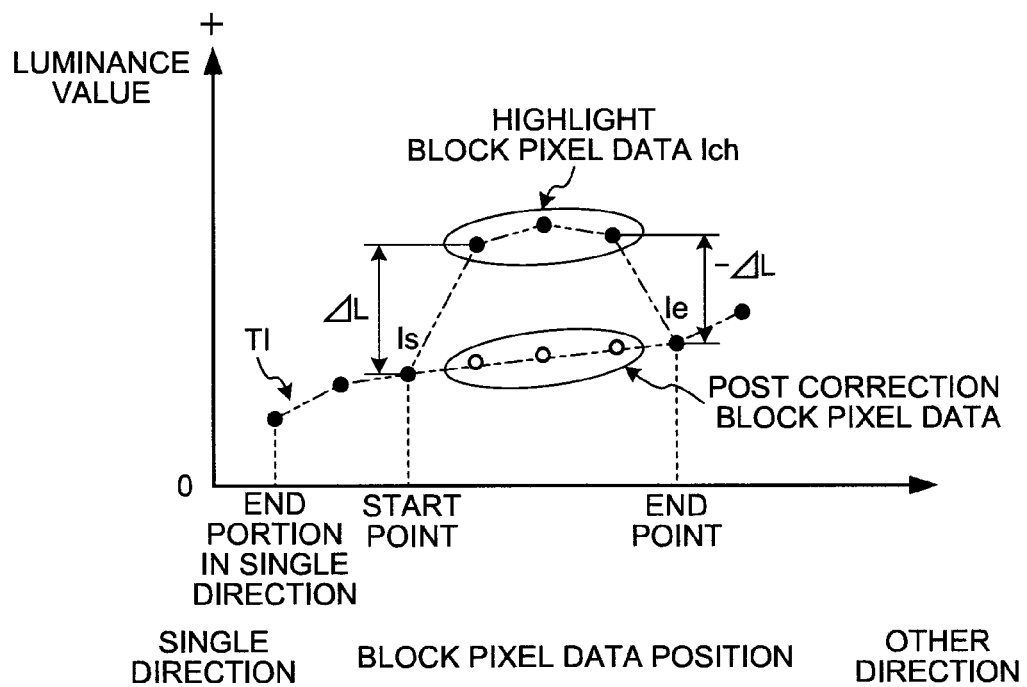
FIG. 8 is a graph of a correcting method of highlighted block pixel data.
Figure 9:
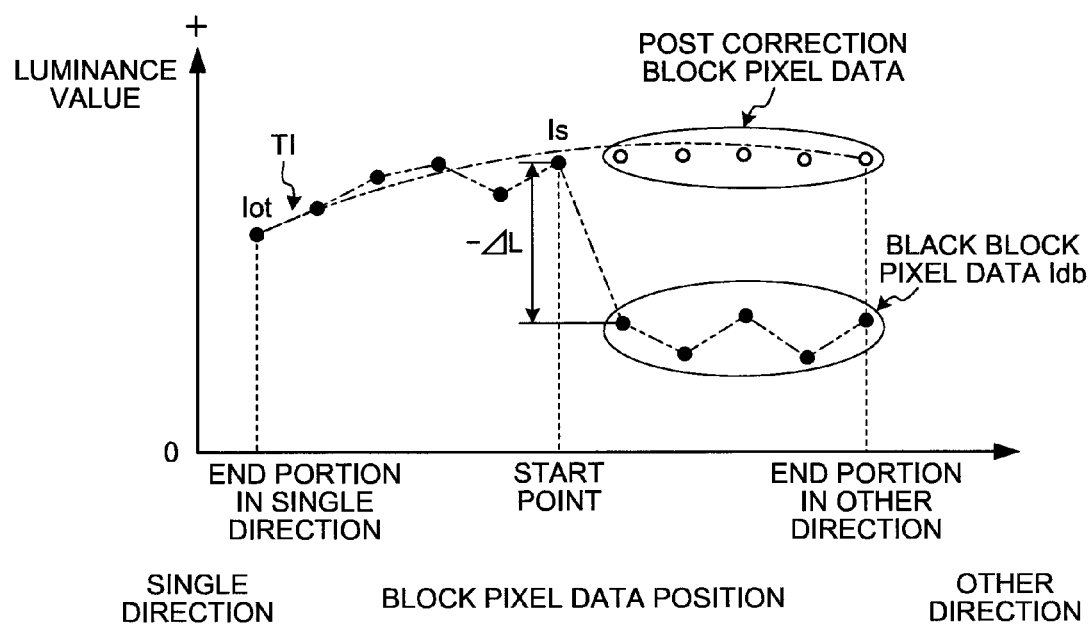
FIG. 9 is a graph of a correcting method when end point block pixel data does not exist.
Figure 10:
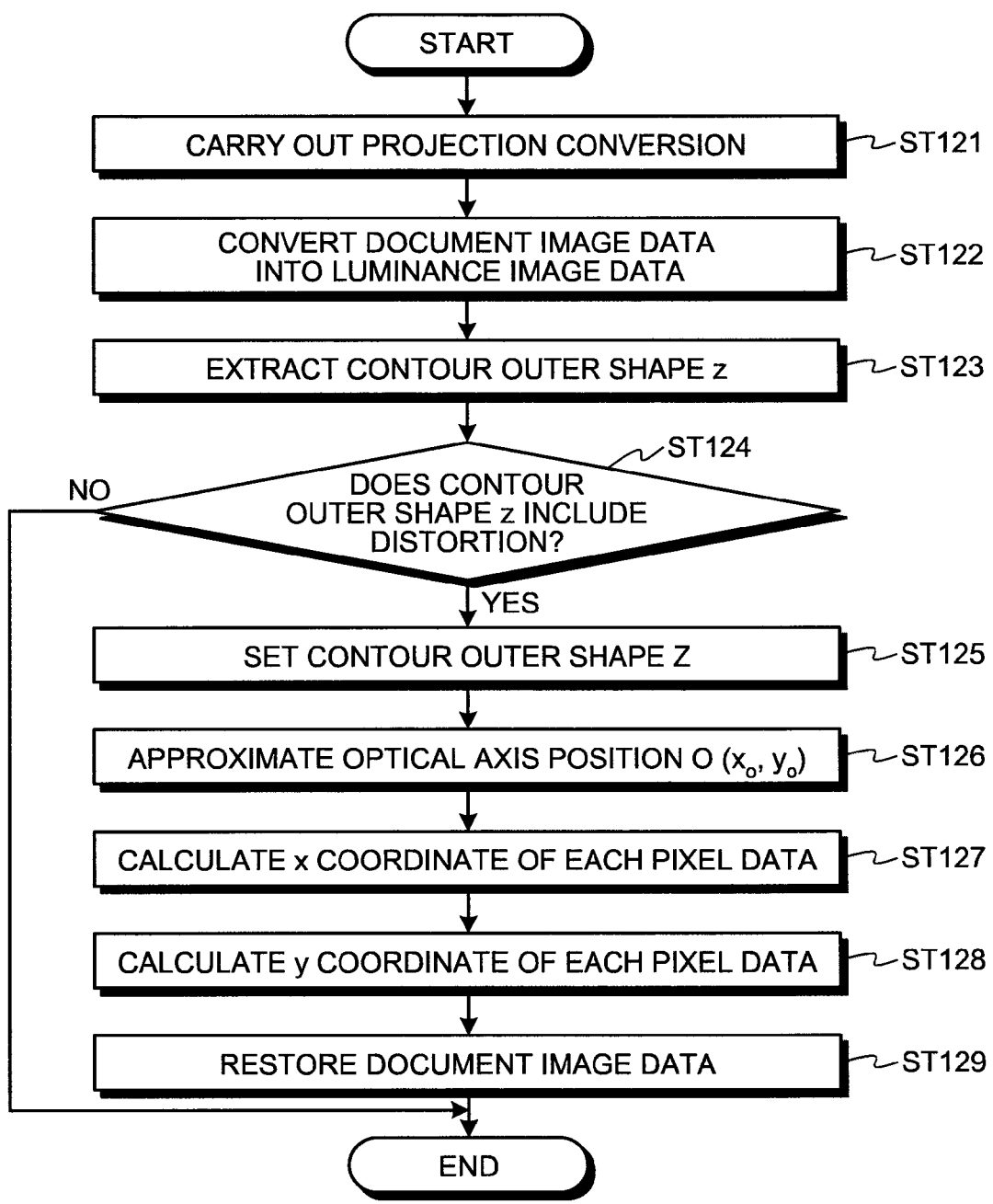
FIG. 10 is a partial flowchart of the image processing method by the image processor.

An image processing method, which is used by the image processor 1 according to the embodiment, is explained next. FIG. 4 is an entire flowchart of the image processing method that is used by the image processor 1. FIG. 5 is a partial flowchart of the image processing method by the image processor 1. FIG. 6 is a schematic diagram of the document image data and the block image data. FIG. 7 is a graph of a correcting method of black block pixel data. FIG. 8 is a graph of a correcting method of highlighted block pixel data. FIG. 9 is a graph of a correcting method when end point block pixel data does not exist. FIG. 10 is a partial flowchart of the image processing method by the image processor 1.

First, as shown in FIG. 4, the image-processing unit 5 of the image processor 1 retrieves the document image data (Step ST1). The image processor 1 retrieves the document image data that is saved in the image memory 4.

Next, the pixel data converter 5a of the image-processing unit 5 converts the retrieved document image data into the luminance image data for luminance correction (Step ST2). As shown in FIG. 6, the pixel data converter 5a carries out the Lab conversion on each pixel data of document image data (W×H) that includes W number of pixel data i in the horizontal direction and H number of the pixel data i in the vertical direction. Thus, the pixel data converter 5a converts the document image data into the luminance image data for luminance correction (W×H) that includes each pixel data ia that includes the luminance value la and the two hue values a and b.

As shown in FIG. 4, the block image data-generator 5b of the image-processing unit 5 splits into a plurality of blocks that include the same number of pixel data, each pixel data ia of the luminance image data for luminance correction that is converted by the pixel data converter 5a. Next, the block image data-generator 5b generates the block image data which includes the block pixel data I in which the maximum luminance value lamax, among the luminance value la of each pixel data ia of each split block, is treated as the luminance value L (Step ST3). As shown in FIG. 6, the block image data-generator 5b splits the luminance image data for luminance correction (W×H) into the multiple block pixel data I (m, n) that include m number of pixel data in the horizontal direction and n number of pixel data in the vertical direction. The block image data-generator 5b generates block image data (W/m×H/n) which includes each block pixel data I (m, n) of the luminance value L (lamax) in which the luminance value L of each pixel data I (m, n), among the luminance value la of each pixel data ia, is treated as the maximum luminance value lamax.

Next, as shown in FIG. 4, the image-processing unit 5 carries out correction of the luminance value L of the block pixel data I (Step ST4). First, as shown in FIG. 5, the change rate-calculating unit 5c of the image-processing unit 5 calculates the change rate ΔL of the luminance value L of the block pixel data I (Step ST41). The change rate-calculating unit 5c sequentially calculates in a single direction, the change rate ΔL of the luminance value Lb of the block pixel data Ib, with respect to the luminance value La of the block pixel data Ia that is adjacently positioned, in the other direction, on one side of the linear block pixel data cluster TI.

Next, the start point end point-setting unit 5d of the image-processing unit 5 determines whether the absolute value of each calculated change rate ΔL is exceeding the predetermined change rate ΔLo (Step ST42). The start point end point-setting unit 5d sequentially compares towards a single direction, each change rate ΔL corresponding to the adjacent block pixel data in a single direction with the predetermined change rate ΔLo. The luminance value L of each block pixel data I is decided by the maximum luminance value lamax of each pixel data ia of each block pixel data I. Accordingly, in each block pixel data I, the luminance value L is significantly low or significantly high compared to the other block pixel data I. In other words, as shown in FIGS. 7 and 8, the linear block pixel data cluster TI is likely to include the pixel data of low luminance value L compared to the other block pixel data I, in other words, black block pixel data Icb that includes pixel data of low luminance value l compared to the luminance value l of the other pixel data. Similarly, the linear block pixel data cluster TI is likely to include the pixel data of high luminance value L compared to the other block pixel data I, in other words, highlighted block pixel data Ich that includes the pixel data of high luminance value l compared to the luminance value l of the other pixel data. As shown in FIG. 7, if the other block pixel data I (Ia) and the black block pixel data Icb (Ib) are sequentially adjacent in a single direction, the change rate ΔL significantly increases in a minus direction and the absolute value of the change rate ΔL exceeds the predetermined change rate ΔLo. As shown in FIG. 8, if the other block pixel data I (Ia) and the highlighted block pixel data Ich (Ib) are sequentially adjacent in a single direction, the change rate ΔL significantly increases in a plus direction and the absolute value of the change rate ΔL exceeds the predetermined change rate ΔLo. Thus, the absolute value of the change rate ΔL exceeding the predetermined change rate ΔLo, in other words, exceeding a value that is based on a difference between the luminance values L of the other block pixel data I and the black block pixel data Icb or the highlighted block pixel data Ich enables to specify that the black block pixel data Icb or the highlighted block pixel data Ich is positioned in the other direction of the other block pixel data I. Accordingly, based on determining whether the absolute value of each calculated change rate ΔL is exceeding the predetermined change rate ΔLo, in other words, based on the change rate ΔL of the adjacent block pixel data Ia, Ib in a single direction, the start point end point-setting unit 5d of the image-processing unit 5 can specify, among the linear block pixel data cluster TI, the black block pixel data Icb or the highlighted block pixel data Ich that is the start point.

Next, as shown in FIG. 5, upon determining that the absolute value of each calculated change rate ΔL exceeds the predetermined change rate ΔLo (Yes at Step ST42), the start point end point-setting unit 5d sets as the start point block pixel data Is, the block pixel data Ia in a single direction among the adjacent block pixel data Ia and Ib corresponding to the change rate ΔL that exceeds the predetermined change rate ΔLo (Step ST43). Due to this, among the adjacent block pixel data Ia and Ib corresponding to the change rate ΔL that exceeds the predetermined change rate ΔLo, the block pixel data Ib in the other direction can be specified as the black block pixel data Icb or the highlighted block pixel data Ich. Upon the start point end point-setting unit 5d determining that the absolute value of each calculated change rate ΔL is less than the predetermined change rate ΔLo (No at Step ST42), the image processing method moves to Step ST5 shown in FIG. 4.

Next, the start point end point-setting unit 5d once again determines whether the absolute value of each calculated change rate ΔL exceeds the predetermined change rate ΔLo (Step ST44). The start point end point-setting unit 5d sequentially compares to the predetermined change rate ΔLo towards a single direction, each change rate ΔL corresponding to the adjacent block pixel data in the other direction with respect to the start point block pixel data Is. As shown in FIGS. 7 and 8, the absolute value of each change rate ΔL corresponding to the adjacent black block pixel data Icb and the absolute value of each change rate ΔL corresponding to the adjacent highlighted block pixel data Ich become less than the predetermined change rate ΔLo. Accordingly, as shown in FIG. 7, if the black block pixel data Icb (Ia) and the other block pixel data I (Ib) are sequentially adjacent in a single direction, the change rate ΔL significantly increases in the plus direction and the absolute value of the change rate ΔL exceeds the predetermined change rate ΔLo. Thus, the absolute value of the change rate ΔL exceeding the predetermined change rate ΔLo, in other words, exceeding a value that is based on a difference between the luminance values L of the black block pixel data Icb or the highlighted block pixel data Ich and the other block pixel data I enables to specify that the black block pixel data Icb or the highlighted block pixel data Ich is positioned in a single direction of the other block pixel data I. Accordingly, based on determining whether the absolute value of each calculated change rate ΔL is exceeding the predetermined change rate ΔLo, in other words, based on the change rate ΔL of the adjacent block pixel data Ia, Ib in a single direction, the start point end point-setting unit 5d of the image-processing unit 5 can specify, among the linear block pixel data cluster TI, the black block pixel data Icb or the highlighted block pixel data Ich that is the start point.

Next, as shown in FIG. 5, upon determining that the absolute value of each calculated change rate ΔL exceeds the predetermined change rate ΔLo (Yes at Step ST44), the start point end point-setting unit 5d sets as the end point block pixel data Ie, the block pixel data Ib in a single direction among the adjacent block pixel data Ia and Ib corresponding to the change rate ΔL that exceeds the predetermined change rate ΔLo (Step ST45). Due to this, among the adjacent block pixel data Ia and Ib corresponding to the change rate ΔL that exceeds the predetermined change rate ΔLo, the block pixel data Ia in a single direction can be specified as the black block pixel data Icb or the highlighted block pixel data Ich.

Next, based on the start point luminance value Ls of the start point block pixel data Is and the end point luminance value Le of the end point block pixel data Ie that are set by the start point end point-setting unit 5d, the block pixel luminance value-correcting unit 5e of the image-processing unit 5 corrects the luminance value Lc of the block pixel data Ic, among the linear block pixel data cluster TI, between the start point block pixel Is and the end point block pixel data Ie (Step ST46). Thus, because the luminance value L of the block pixel data I, which is specified as the black block pixel data or the highlighted block pixel data, is shading corrected based on the luminance value of the block pixel data I other than the black block pixel data or the highlighted block pixel data, luminance unevenness can be curbed.

Upon determining that the absolute value of each change rate ΔL, which is calculated by the start point end point-setting unit 5d, is less than the predetermined change rate ΔLo (No at Step ST44), based on the luminance value Lot of the block pixel data Iot that is positioned at the end on one side of the set start point block pixel data Is and the start point luminance value Ls of the set start point block pixel data Is, the block pixel luminance value-correcting unit 5e corrects the luminance value Ld of each block pixel data Id in the other direction of the start point block pixel data Is (Step ST47). As shown in FIG. 9, if all the block pixel data Id in the other direction of the start point block pixel data Is are black block pixel data Idb or highlighted block pixel data Idh (not shown in FIG. 9), the absolute value of each change rate ΔL corresponding to the adjacent black block pixel data Idb and the absolute value of each change rate ΔL corresponding to the adjacent highlighted block pixel data become less than the predetermined change rate ΔLo. Accordingly, if the start point end point-setting unit 5d cannot set the end point block pixel data Ie, in other words, even if the block pixel data from the block pixel data Id in the other direction of the start point block pixel data Is until the block pixel data Id at the end in the other direction are the black block pixel data Icb or the highlighted block pixel data Ich, the block pixel luminance value-correcting unit 5e can specify the black block pixel data or the highlighted block pixel data. Thus, because the luminance value L of the block pixel data I, which is specified as the black block pixel data or the highlighted block pixel data, is shading corrected based on the luminance value of the block pixel data I other than the black block pixel data or the highlighted block pixel data, luminance unevenness can be curbed.

Next, as shown in FIG. 5, the block pixel luminance value-correcting unit 5e averages the luminance values Lc and Ld of the block pixel data Ic and Id respectively (Step ST48). The block pixel luminance value-correcting unit 5e treats as the luminance value L (Lc, Ld) of the corrected block pixel data I (Ic, Id), average values Lca and Lda of the luminance values Lcy (Lcx), Ldy (Ldx) of the block pixel data Icy (Icx), Idy (Idx) respectively that are the corrected block pixel data in the linear block pixel data cluster TIy (TIx) in a single direction and the luminance value Lf (Lf=Lcx (Lcy), Ldx (Ldy) if corrected and Lf=L if not corrected) of the block pixel data If (If=Icx (Icy), Idx (Idy) if corrected and If=I if not corrected) in the linear block pixel data cluster TIx (TIy) in the other direction in the same position with respect to the corrected block pixel data Icy (Icx), Idy (Idx) and the block image data. In other words, based on a correction result of the linear block pixel data cluster TIy in the vertical direction and a correction result of the linear block pixel data cluster TIx in the horizontal direction, the block pixel luminance value-correcting unit 5e averages the luminance value of the corrected block pixel data. Thus, luminance unevenness can be further curbed.

Next, as shown in FIG. 4, the luminance value-substituting unit 5f of the image-processing unit 5 calculates a block average value LA (Step ST5). The luminance value-substituting unit 5f calculates as the block average value LA, an average value of each luminance value Lg, Lh of each block pixel data Ig, Ih of the adjacent block pixel data cluster KI that includes, among each block pixel data I, the single block pixel data Ig and the block pixel data Ih that is adjacent to the single block pixel data Ig.

Next, the luminance value-substituting unit 5f determines whether the luminance value L of the block pixel data I of the adjacent block pixel data cluster KI is less than the block average value LA (Step ST6).

Next, among the adjacent block pixel data cluster KI, the luminance value-substituting unit 5f substitutes by the block average value LA (Step ST7), the luminance value L of the block pixel data I in which the luminance value L is less than the block average value LA (Yes at Step ST6). Further, among the adjacent block pixel data cluster KI, the luminance value-substituting unit 5*f* does not substitute by the block average value LA, the luminance value L of the block pixel data I in which the luminance value L is greater than or equal to the block average value LA (No at Step ST6).

Next, based on the luminance value L of each block pixel data I, the pixel luminance value-setting unit 5*g* of the image-processing unit 5 sets the luminance value lb of each pixel data ib corresponding to each block pixel data I (Step ST8). Based on the luminance value Lj of the single block pixel data Ij and the luminance value Lk of the block pixel data Ik that is adjacent to the single block pixel data Ij, the pixel luminance value-setting unit 5*g* sets the luminance value lj (lb) of each pixel data ij (ib) corresponding to the single block pixel data Ij among each block pixel data I. Thus, the luminance image data for post process luminance correction, which includes each pixel data ib of the set luminance value lb, is generated.

Next, the pixel luminance value-setting unit 5*g* calculates the post setting average value lba, the post conversion average value laa, the post setting peak value hba, and the post conversion peak value haa (Step ST9). The post setting average value lba is an average value of the set luminance value lb of each pixel data ib. The post conversion average value laa is an average value of the luminance value la of each pixel data ia of the luminance image data for luminance correction that is converted by the pixel data converter 5*a*. The post setting peak value hba is the peak value of the histogram based on the set luminance value lb of each pixel data ib. The post conversion peak value haa is the peak value of the histogram based on the luminance value la of each pixel data ia of the luminance image data for luminance correction that is converted by the pixel data converter 5*a*.

Next, the pixel luminance value-setting unit 5*g* corrects the luminance value lb of the pixel data ib (Step ST10). The pixel luminance value-setting unit 5*g* corrects the set luminance value lb of each pixel data ib based on the ratio (lba/laa) of the post setting average value lba and the post conversion average value laa and the ratio (hba/haa) of the post setting peak value hba and the post conversion peak value haa. Due to this, the luminance image data for post process luminance correction, which includes each pixel data ib of the luminance value lb, is corrected, thus regenerating the luminance image data for post process luminance correction that includes each pixel data ic of the corrected luminance value lc. The pixel luminance value-setting unit 5*g* corrects the luminance value lb of each pixel data ib based on a luminance value l of each pixel data I and a peak value h based on the luminance value l. Due to this, even if the document image data includes pixel data corresponding to a color insertion diagram or a table, excessive whitening or over-exposing of the document image data can be curbed.

Next, the reconverter 5*h* of the image-processing unit 5 reconverts the generated luminance image data for post process luminance correction into the document image data (Step ST11). The reconverter 5*h* carries out RGB conversion on each pixel data ic of the luminance image data for post process luminance correction (W×H) that includes each pixel data ic having the luminance value lc and the two hue values a and b, thus reconverting the generated luminance image data for post process luminance correction into the document image data that includes the RGB values.

Next, the image-processing unit 5 carries out shape correction of the reconverted document image data (Step ST12). As shown in FIG. 10, first the projection converter 5*i* of the image-processing unit 5 carries out the projection conversion of the reconverted document image data (Step ST121).

Next, the pixel data converter 5*a* converts the document image data, which is subjected to the projection conversion, into the luminance image data for luminance correction (Step ST122). As shown in FIG. 6, the pixel data converter 5*a* carries out the Lab conversion on each pixel data of the document image data (W×H) that is subjected to the projection conversion and that includes W number of the pixel data i in the horizontal direction and H number of the pixel data i in the vertical direction. Thus, the document image data is converted into the luminance image data for shape correction (W×H) that includes each pixel data it having the luminance value lt and the two hue values at and bt.

Next, the contour outer shape-setting unit 5*j* of the image-processing unit 5 extracts the contour outer shape z of the luminance image data for shape correction (Step ST123). The contour outer shape-setting unit 5*j* uses a known technology such as cropping and extracts the contour outer shape z of the luminance image data for shape correction. In other words, from each pixel data it of the luminance image data for shape correction, the contour outer shape-setting unit 5*j* extracts a boundary of each pixel data itd corresponding to the document image and each pixel data itb corresponding to the background of the document image.

Next, the contour outer shape-setting unit 5*j* determines whether the contour outer shape z of the luminance image data for shape correction includes a distortion (Step ST124). The luminance image data for luminance correction is based on the document image that is originally a flat surface but is not a flat surface in the imaged condition. After the projection converter 5*i* has carried out the projection conversion, the contour outer shape z includes a pair of two sides that are formed by the parallel straight lines and another pair of two sides that are formed by the curved lines. Accordingly, if the luminance image data for shape correction is based on the document image that is not a flat surface in the imaged condition but is originally a flat surface, the contour outer shape-setting unit 5*j* determines that the contour outer shape z of the luminance image data for shape correction includes a distortion (Yes at Step ST124).

Next, upon determining that the contour outer shape z of the luminance image data for shape correction includes a distortion (Yes at Step ST124), the contour outer shape-setting unit 5*j* sets the contour outer shape Z of the luminance image data for shape correction (Step ST125). Based on the positions of the randomly selected multiple pixel data itd, the contour outer shape-setting unit 5*j* calculates the respective curved lines Q1 and Q2 of the two sides, and sets as the contour outer shape Z of the luminance image data for shape correction, the parallel straight lines of the pair of two sides and the calculated curved lines Q1 and Q2 that are the other pair of two sides. Upon determining that the contour outer shape z of the luminance image data for shape correction does not include a distortion (No at Step ST124), the contour outer shape-setting unit 5*j* determines that shape correction of the reconverted document image data is not required, and ends the image processing method.

Next, the optical axis position-approximating unit 5*k* of the image-processing unit 5 approximates the position O ($x_o$, $y_o$) of the optical axis (Step ST126). Based on the curved lines Q1 and Q2 that are calculated as the other pair of two sides among the contour outer shape Z, the optical axis position-approximating unit 5*k* approximates the position O ($x_o$, $y_o$) of the optical axis.

The pixel data position-calculating unit 5*l* of the image-processing unit 5 calculates the x coordinate ($x_{it}$) of the flat surface position it ($x_{it}$, $y_{it}$) in the two-dimensional flat surface, which does not include a distortion, of the contour outer shape Z of each pixel data it of the luminance image data for shape correction (Step ST127). Based on the position O ($x_o$, $y_o$) of the optical axis that is calculated by the optical axis position-approximating unit 5$k$, the focal length f of the two-dimensional image sensor 2, and the pitch k of the imaging elements that form the two-dimensional image sensor 2, the pixel data position-calculating unit 5$l$ calculates the x coordinate ($x_{itd}$) of the flat surface position it ($x_{itd}$, $y_{itd}$) of each pixel data itd of the luminance image data for shape correction.

The pixel data position-calculating unit 5$l$ calculates the y coordinate ($y_{it}$) of the flat surface position it ($x_{it}$, $y_{it}$) in the two-dimensional flat surface, which does not include a distortion, of the contour outer shape Z of each pixel data it of the luminance image data for shape correction (Step ST128). Based on the y coordinate of the original position ($x_{itdo}$, $y_{itdo}$) of each pixel data itd of the luminance image data for shape correction, the pixel data position-calculating unit 5$l$ calculates the y coordinate ($y_{itd}$) of the flat surface position itd ($x_{itd}$, $y_{itd}$) of each pixel data itd.

Next, the restoring unit 5$m$ of the image-processing unit 5 restores the document image data (Step ST129). Based on the flat surface position itd ($x_{itd}$, $y_{itd}$) in the two-dimensional flat surface position of each pixel data itd corresponding to the document image that is calculated by the pixel data position-calculating unit 5$l$, the restoring unit 5$m$ generates the post shape correction luminance image data that includes each pixel data iu having the luminance value lu and the two hue values au and bu, and reconverts the generated post shape correction luminance image data into the document image data.

In an image processor and an image processing method according to an embodiment of the present invention, block pixel data, which includes black pixel data or highlighted pixel data of document image data, is specified based on a change rate of the adjacent block pixel data in a single direction. Based on luminance values of the other block pixel data, a luminance value of a specific block pixel data having a luminance change is shading corrected. Thus, if the document image data includes the black pixel data or the highlighted pixel data to some extent, carrying out the shading correction enables to reliably curb luminance unevenness. Accordingly, readability of the document image data can be enhanced.

Further, in the image processor and the image processing method according to the embodiment, shape correction is carried out based on a position of an optical axis that is approximated based on a contour outer shape of luminance image data for shape correction, a focal length of a two-dimensional image sensor, and a pitch of imaging elements that form the two-dimensional image sensor. Due to this, the shape correction can be carried out even if a distance between the two-dimensional image sensor and the document image is not known. Accordingly, readability of the document image data, which is generated based on the document image that is shot by the two-dimensional image sensor and that is originally a flat surface but not a flat surface in an imaged condition, can be enhanced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processor that carries out image processing of document image data that includes a plurality of pixel data that are generated due to shooting of a document image by a two-dimensional image sensor, the image processor comprising:

a pixel data converter that converts the document image data into luminance image data that includes a luminance component;

a block image data-generator that splits each pixel data of the luminance image data into a plurality of blocks that include the same number of pixel data, and generates block image data that includes block pixel data wherein a maximum luminance value, among a luminance value of each pixel data of each block, is treated as the luminance value of the respective block pixel data;

a change rate-calculating unit that sequentially calculates towards a single direction, with respect to the luminance value of the block pixel data in the single direction that is adjacent to a linear block pixel data cluster that includes the adjacent block pixel data in the single direction, a change rate of the luminance value of the block pixel data in other direction;

a start point end point-setting unit that compares, with a predetermined change rate towards the single direction, an absolute value of each calculated change rate, sets as start point block pixel data of luminance change, upon the absolute value of the change rate exceeding the predetermined change rate, the block pixel data in the single direction among the adjacent block pixel data, and sets as end point block pixel data of luminance change, upon the absolute value of the change rate exceeding the predetermined change rate once again, the block pixel data in the other direction among the adjacent block pixel data;

a block pixel luminance value-correcting unit that corrects, based on a start point luminance value of the set start point block pixel data and an end point luminance value of the set end point block pixel data, each luminance value of the block pixel data between the start point block pixel data and the end point block pixel data;

a luminance value-substituting unit that calculates, among each block pixel data, an average value of each luminance value of an adjacent block pixel data cluster that includes a single block pixel data and block pixel data that are adjacent to the single block pixel data, and substitutes by the average value, the luminance value of the block pixel data, among the adjacent block pixel data cluster, wherein the luminance value is less than the calculated average value;

a pixel luminance value-setting unit that sets, based on the luminance value of the block pixel data, the luminance value of each pixel data corresponding to the block pixel data, and generates post process luminance image data; and a reconverter that reconverts the generated post process luminance image data into the document image data.

2. The image processor according to claim 1, wherein the single direction is a vertical direction and a horizontal direction of the block image data, and the block pixel luminance value-correcting unit treats, upon at least any one of the linear block pixel data cluster in the vertical direction and the linear block pixel data cluster in the horizontal direction including corrected block pixel data, the average value, of the luminance value of the corrected block pixel data in the linear block pixel data cluster in the single direction and the luminance value of the block pixel data in the linear block pixel data cluster in the other direction that is in the same position with respect to the block image data as the corrected block pixel data, as the luminance value of the corrected block pixel data.

3. The image processor according to claim 1, wherein the pixel luminance value-setting unit sets, among each block pixel data, based on the luminance value of the single block pixel data and the luminance value of the block pixel data that is adjacent to the single block pixel data, the luminance value of each pixel data corresponding to the single block pixel data.

4. The image processor according to claim 1, wherein the pixel luminance value-setting unit corrects, based on at least any one of a ratio of an average value of the set luminance value of each pixel data and an average value of the luminance value of each pixel data of the luminance image data that is converted by the pixel data converter, and a ratio, of a peak value of a histogram that is based on the set luminance value of each pixel data and a peak value of the histogram that is based on the set luminance value of each pixel data that is converted by the pixel data converter, the set luminance value of each pixel data.

5. The image processor according to claim 1, wherein the block pixel luminance value-correcting unit corrects, upon the start point end point-setting unit not being able to set the end point block pixel data, based on the luminance value of the block pixel data that is positioned in the single direction from the set start point block pixel data and the start point luminance value of the set start point block pixel data, the luminance value of each block pixel data in the other direction from the start point block pixel data.

6. The image processor according to claim 1, further comprising:
   a projection converter that carries out projection conversion of the document image data;
   a contour outer shape-setting unit that sets a contour outer shape of the luminance image data that includes the luminance component, converted by the pixel data converter, of the document image data that is converted by the projection converter;
   an optical axis position-approximating unit that approximates, based on a distortion of the contour outer shape that is set by the contour outer shape-setting unit, a position of an optical axis;
   a pixel data position-calculating unit that calculates, based on the position of the optical axis that is approximated by the optical axis position-approximating unit, a focal length of the two-dimensional image sensor, and a pitch of imaging elements that form the two-dimensional image sensor, a flat surface position in a two dimensional flat surface, that does not include a distortion, of the contour outer shape of each pixel data of the luminance image data; and
   a restoring unit that restores, based on the two dimensional flat surface position of each pixel data that is calculated by the pixel data position-calculating unit, the document image data.

7. An image processing method that carries out image processing of document image data that includes a plurality of pixel data that are generated due to shooting of a document image, the image processing method being performed by an image processor and comprising:

converting the document image data into luminance image data that includes a luminance component, said converting being performed by a pixel data converter of the image processor;

splitting each pixel data of the luminance image data into a plurality of blocks that include the same number of pixel data, and generating block image data that includes block pixel data wherein a maximum luminance value, among a luminance value of each pixel data of each block, is treated as the luminance value of the respective block pixel data, said splitting being performed by a block image data-generator of the image processor;

sequentially calculating towards a single direction, with respect to the luminance value of the block pixel data in the single direction that is adjacent to a linear block pixel data cluster that includes the adjacent block pixel data in the single direction, a change rate of the luminance value of the block pixel data in other direction, said sequentially calculating being performed by a change rate-calculating unit of the image processor;

comparing, with a predetermined change rate towards the single direction, an absolute value of each calculated change rate, setting as start point block pixel data of luminance change, upon the absolute value of the change rate exceeding the predetermined change rate, the block pixel data in the single direction among the adjacent block pixel data, and setting as end point block pixel data of luminance change, upon the absolute value of the change rate exceeding the predetermined change rate once again, the block pixel data in the other direction among the adjacent block pixel data, said comparing being performed by a start point end point-setting unit of the image processor;

correcting, based on a start point luminance value of the set start point block pixel data and an end point luminance value of the set end point block pixel data, each luminance value of the block pixel data between the start point block pixel data and the end point block pixel data, said correcting being performed by a block pixel luminance value-correcting unit of the image processor;

calculating, among each block pixel data, an average value of each luminance value of an adjacent block pixel data cluster that includes a single block pixel data and block pixel data that are adjacent to the single block pixel data, and substituting by the average value, the luminance value of the block pixel data, among the adjacent block pixel data cluster, wherein the luminance value is less than the calculated average value, said calculating being performed by a luminance value-substituting unit of the image processor;

setting, based on the luminance value of the block pixel data, the luminance value of each pixel data corresponding to the block pixel data, said setting being performed by a pixel luminance value-setting unit of the image processor; and reconverting post process luminance image data that includes the pixel data having the set luminance value into the document image data, said reconverting being performed by a reconverter of the image processor.

* * * * *